United States Patent [19]

Brubaker, Jr.

[11] 4,310,984
[45] Jan. 19, 1982

[54] RODENT AND ANIMAL TRAP

[76] Inventor: Fred A. Brubaker, Jr., 336 Mitchler Ave., Murphys, Calif. 95247

[21] Appl. No.: 136,939

[22] Filed: Apr. 3, 1980

[51] Int. Cl.³ .......................................... A01M 23/00
[52] U.S. Cl. ...................................................... 43/61
[58] Field of Search .......................................... 43/61

[56] References Cited

U.S. PATENT DOCUMENTS

| | | | |
|---|---|---|---|
| 1,011,207 | 12/1911 | Kemp | 43/61 |
| 2,478,605 | 8/1949 | Symens | 43/61 |
| 2,573,228 | 10/1951 | Slauth | 43/61 |
| 3,975,857 | 8/1976 | Branson | 43/61 |

Primary Examiner—Jimmy C. Peters

[57] ABSTRACT

A three-sided molded elongated hollow body consisting of opaque plastic material and defining a channelled front merging into a channelled top and a pair of channelled sides and forming a closable animal entrance, a transparent plastic trap door movably mounted on the body for controlling the animal entrance, a transparent plastic rear closure detachably connected to the top and the sides, a transparent plastic bottom detachably connected to the rear closure and to the sides to define a box-like structure, and a single wire trip engageable with the trap door and actuatable by an animal entering the body to release the trap door effecting closure of the animal entrance thereby.

3 Claims, 4 Drawing Figures

RODENT AND ANIMAL TRAP

This application is directed to an invention which is an improvement upon the invention disclosed and claimed in my prior application, Ser. No. 909,931, filed May 28, 1978 and entitled RODENT AND ANIMAL TRAP, now abandoned.

Heretofore, a relatively large number of devices have been devised and marketed for trapping animals of various sizes, including smaller animals such as mice and rats as well as gophers and the like. And a number of Letters Patent of the United States have been granted for such devices among which are the patent to Levesey, No. 1,309,630 covering a rat trap comprising a hollow box provided with a gravity-lowered gate movably mounted thereon and held open by a trip rod engaging a shoulder on the inner face of the gate; and a somewhat similar patent to Pearl, No. 1,735,786 which discloses a box 10 provided with a movably mounted door 13 which is held in open position by a latch rod 16 engaging a shoulder on the door, together with a bait hook on the opposite end of the rod which extends through a rear door 12 of the box. A variety of animal traps are shown in various patents of this general nature such as the patents to Boynton, No. 1,590,879; to Pendry, No. 2,163,961; to Woolworth, No. 2,524,504; and to Symens, No. 2,478,605 which all cover different structures in this same environment. Other similar inventions are disclosed in U.S. Pat., Nos. 3,113,395; 1,735,786; 451,163; 2,873,228; 3,823,504; 993,238; 2,551,903; and 2,163,961. Applicant's present invention is directed to a simplicity of construction which does not include springs or any dangerous parts that are harmful to children; which is quick acting to trap an animal safely and effectively; which is less expensive to construct than prior traps affording a sturdy, durable and attractive structure which enables ready disposal of the caught animal without touching by the human hand during the disposal thereof.

A primary object of the invention is to provide a rodent and animal trap having a minimum number of simple parts which are easily and inexpensively manufactured for ready use and re-use over long periods of time.

Another important object of the present invention is to provide a rodent and animal trap of the indicated nature which is additionally characterized by its simplicity of operation with respect to the associated trip mechanism for releasably holding the trap door in a readily closable portion.

A still further object of my invention is to provide a rodent and animal trap of the aforementioned character of a unique construction to facilitate the baiting of the trap.

Another object of the invention is to provide an improved rodent and animal trap of the indicated nature which includes a transparent rear end plastic closure as well as a transparent bottom to enable full size view of a trapped animal and having a smooth inner surface on its transparent bottom to enable disposal of the trapped animal without use of the hands.

Other objects of the invention, together with some of the advantageous features thereof, will appear from the following description of a preferred embodiment of the invention exemplified in the accompanying drawings in its best mode of construction and manner of using the invention.

Referring to the drawings.

Figure 1:
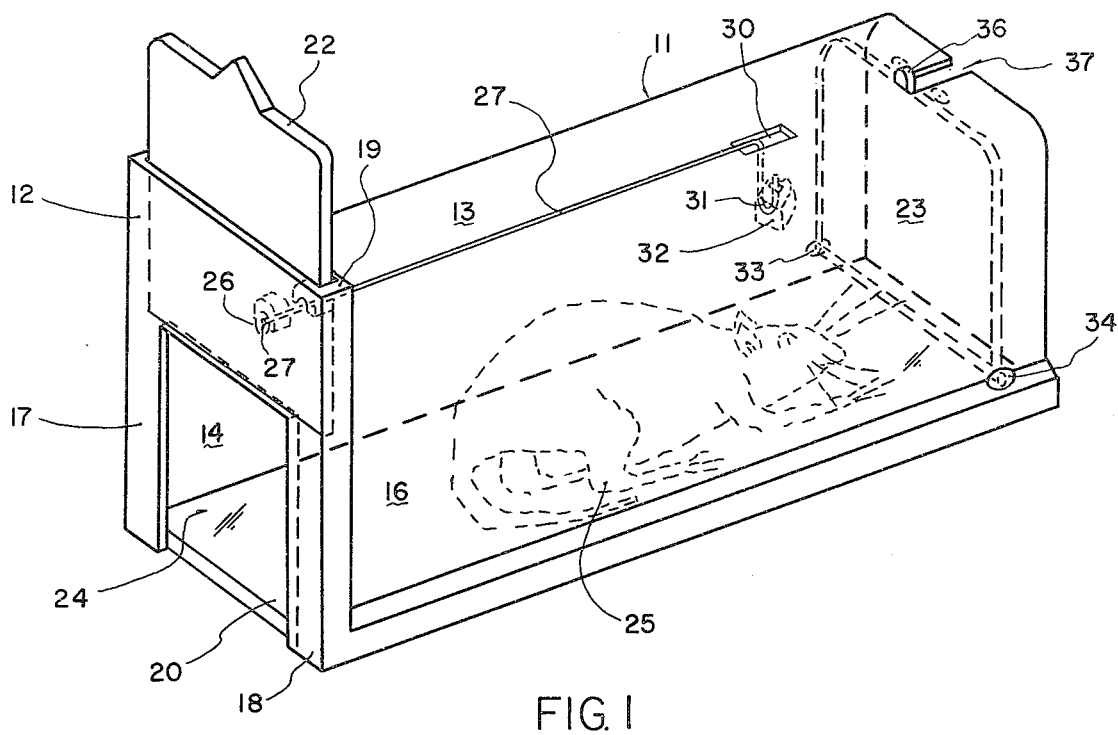
FIG. 1 is a perspective view of a preferred embodiment of the invention in fully assembled state ready for use.

In its preferred mode of construction, my animal trap comprises an elongated hollow body consisting of a preferably transparent bottom, a pair of transparent end closures removably connected to a pair of plastic sides, as well as connected to a plastic top and said bottom to define a box-like structure having an animal entrance and an animal compartment communicating with said entrance; one of said end closures comprising a trap door slidably mounted in said animal entrance for controlling the same, together with a trip means engaging said trap door to releasably hold the same in a raised position, and a bait hook on said trip means for holding edible bait which when disturbed by an animal actuates said trip means to release said trap door thereby closing said animal entrance and trapping said animal in said compartment of said box-like structure.

In accordance with my present invention 1 provide a three-sided molded elongated body 11 consisting of opaque plastic material and defining a channeled front 12 merging into a top 13 and a pair of sides 14 and 16; the front 12 having a pair of opposed side channels 17 and 18 which merge into a top channel 19 and forming an animal entrance 20. In addition to the elongated body 11, my improved animal trap comprises a transparent plastic bottom 21 and a pair of transparent plastic end closures 22 and 23 fited to the body 11 to define when assembled a hollow box-like structure having an inner elongated compartment 24 in which a trapped animal, such as a mouse 25, is confined until disposed in a manner suitable to the captor. The end closure 22 is so molded as to provide a recess 26 therein adjacent to the bottom thereof at its transverse center and is vertically slidable in the guide channel 17, 18 and 19 provided in the front 12 of the body 11 and constitutes in effect a trap door for closing the animal entrance 20 when an animal, such as the mouse 25 enters into the communicating elongated compartment 24.

Figure 2:
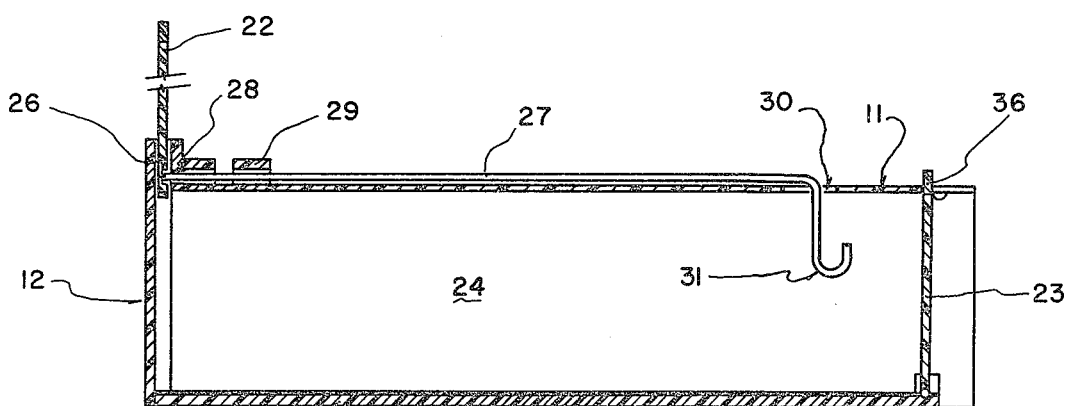
FIG. 2 is a sectional elevational view of the embodiment of FIG. 1; this view being taken on the line 2—2 of FIG. 3.
Figure 3:
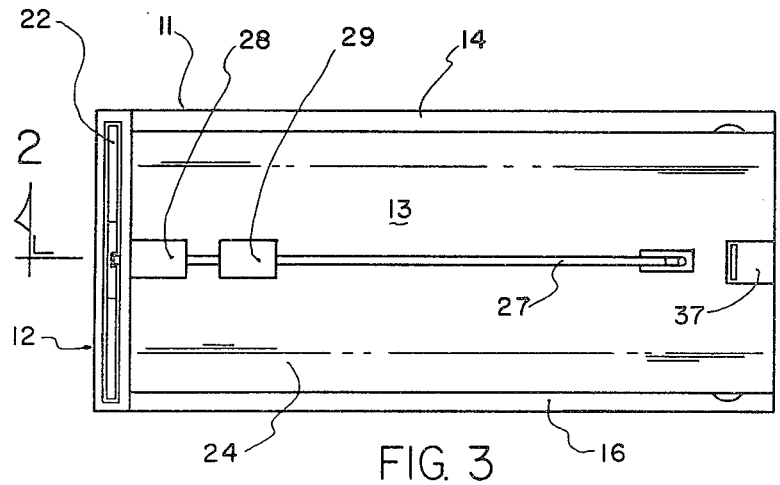
FIG. 3 is a top plan view of the embodiment of FIG. 1.
Figure 4:
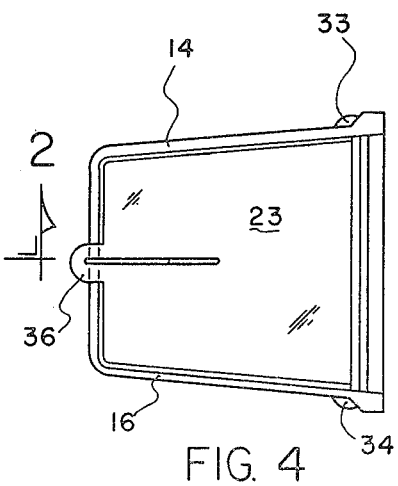
FIG. 4 is a perspective view of an end closure for the preferred embodiment of FIG. 1

As particularly illustrated in FIGS. 1 to 3 inclusive of the annexed drawings, a trip mechanism is provided as a fifth element of my present improvement; such trip mechanism being essentially a single wire 27 which for a major portion of its length is straight and extends for a major distance of the top 13 of body 11 and is movably mounted slightly above the top in a pair of guides 28 and 29 formed on the top 13 in close proximity to one another as well as to the front 12 thereof. The tip of wire 27 at the front thereof normally seats in the recess 26 of front closure 22 to releasably hold the trap door 22 in a raised position with respect to the animal entrance 20. As shown, the wire 27 is bent at right angles and is introduced through an aperture 30 in the top 13 into compartment 24 and is therein turned upon itself to provide a bait hook 31 on which an edible substance, such as a piece of cheese 32 is disposed.

It is to be noted that the bait hook 31 is positioned in close proximity to the rear end closure 23 which is so molded as to provide out-turned flanges 33 and 34 on opposite sides thereof and at the bottom of the closure which enter opposed channels in the sides 14 and 16 of the elongated body 12 when the end closure 23 is press-fitted into operative closing position. The closure 23 also is molded with a projecting tab 36 which enters an aperture 37 in the rear end of the top 13 of body 12, and serves to unseat the end closure and aids in the removal thereof whenever it becomes necessary to replace edible material onto the bait hook 31 close at hand; after which the end closure may be readily snapped into closing position again.

It is to be observed that whenever an animal, such as a mouse 25 enters the compartment 24 and nibbles at the bait 32, the trip wire 27 is actuated to move the tip thereof and withdraw the same from the recess 26 of the trap door 22 causing it to drop rapidly in the channels 17 and 18 of the body 12 to the bottom 21 thus closing the entrance 20.

It is to be understood that the appended claims are intended to cover the embodiment illustrated as well as variations thereof within the scope and purview of the invention.

I claim:

1. A rodent and animal trap comprising an elongated hollow body consisting of an integral opaque plastic top and a pair of opaque plastic sides as well as a channeled front section defining an animal entrance, a transparent plastic bottom, and a pair of transparent end closures removably connected to said elongated body to provide an elongated box-like structure having an inner elongated compartment in communication with said animal entrance; one of said transparent end closures constituting a trap door controlling said entrance, and trip means engaging said trap door to releasably hold a recess in said trap door in a raised position and opening said animal entrance, and a bait hook on said trip means depending into said compartment; movement of said bait hook effecting the withdrawal of engagement of said trip means from said recess of said trap door thereby effecting the rapid dropping of said trap door onto said bottom of said body and the closing of said animal entrance to trap an animal in said compartment for subsequent disposal; the tip of said trip means reengageable with said recess of said front door to automatically relatch said door in a raised position upon the flipping of said elongated body.

2. A rodent and animal trap as set forth in claim 1 wherein said trip means comprises a single wire having one end thereof disposed in a recess in said trap door.

3. A rodent and animal trap as set forth in claim 2, and a bait hook on the other end of said single wire depending therefrom and confined within said compartment adjacent to the other of said end closures.

* * * * *